United States Patent [19]

Pihl

[11] 4,000,343

[45] Dec. 28, 1976

[54] SUBSTITUTE TEXTILE MATERIALS COMPOSED OF VINYL POLYMER IMPREGNATED CREPED TISSUE PAPER AND PROCESS OF PRODUCING SAME

[76] Inventor: Lennart Pihl, Via Monescia 1, Ascona, Switzerland, 6612

[22] Filed: Dec. 16, 1974

[21] Appl. No.: 533,080

Related U.S. Application Data

[63] Continuation-in-part of Ser. No. 273,319, July 19, 1972, abandoned, which is a continuation of Ser. No. 402,317, Oct. 7, 1964, abandoned.

[30] Foreign Application Priority Data

Oct. 10, 1963 Sweden .................... 11088/63
May 25, 1964 Sweden ..................... 7732/64

[52] U.S. Cl. .................... 428/154; 428/153; 428/481; 428/511; 428/514; 428/535; 428/537

[51] Int. Cl.² ........................ B32B 29/00

[58] Field of Search .......... 428/175, 153, 154, 481, 428/482, 511, 514, 534, 535, 536; 156/62.2, 333, 206; 260/31.8 H, 23 A; 427/391, 395

[56] References Cited

UNITED STATES PATENTS

| | | | |
|---|---|---|---|
| 2,339,326 | 1/1944 | Fourness et al. | 154/54 |
| 2,343,930 | 3/1944 | Rowe | 428/152 |
| 2,657,186 | 10/1953 | Klein et al. | 260/33.2 R |
| 2,897,109 | 7/1959 | Voigtman | 154/50 |
| 2,995,472 | 8/1961 | Sweeney et al. | 428/220 |
| 3,051,995 | 9/1962 | Ferrell et al. | 18/55 |
| 3,058,933 | 10/1962 | Ikeda | 260/17 |
| 3,186,889 | 6/1965 | Boldini et al. | 156/324 |

*Primary Examiner*—George F. Lesmes
*Assistant Examiner*—Stanley S. Silverman
*Attorney, Agent, or Firm*—Ostrolenk, Faber, Gerb & Soffen

[57] ABSTRACT

The production of substitute textile materials is achieved by impregnating one or more creped tissue paper sheets with an extensibility of between 3% and 100% and a weight of 15–30 grams per square meter, which may be laminated with impregnated or unimpregnated similar sheets of creped tissue paper, with a vinyl chloride polymer.

9 Claims, No Drawings

SUBSTITUTE TEXTILE MATERIALS COMPOSED OF VINYL POLYMER IMPREGNATED CREPED TISSUE PAPER AND PROCESS OF PRODUCING SAME

This is a continuation-in-part of application Ser. No. 273,319 filed July 19, 1972 now abandoned; which was a continuation of application Ser. No. 402,317 filed Oct. 7, 1964. and now abandoned.

Paper base materials which have been processed to serve as textile materials are unsatisfactory because of their undue stiffness preventing the usual softness and drape associated with textile fibers and fabrics. Various methods of processing and treatment to soften such fibers have not been found to be satisfactory and particularly hygroscopic plasticizers are not satisfactory to give such a softness and drape.

Although several layers of tissue paper base fabrics may be bound together with the aid of a scrim fabric to form a combined web, this material does not have the softness of a woven textile material and it has very different wet strength and porosity characteristics than a textile material. Nor can paper base products be impregnated and coated in the form of pulp fibers in a paper chest by synthetic and natural rubber latex lacquers and hot melt materials of wax or the like to achieve a textile-like material.

It is most important that the individual fibers have a regulated softness and lack undesirable stiffness and have a desirable openness between fibers to achieve a textile effect and it is only when these fibers can stretch and move independently and flexibly in very thin sections that a satisfactory paper fabric is produced.

It has been found that the high density of paper products made on a paper machine from relatively short paper fibers will not give a comparative flexibility in texture and softness as compared to cotton fibers, woven or otherwise processed into fabrics and with wet paper making processes on paper screen machines, a dense sheet is usually produced having quite differenet properties than soft and flexible textile-like materials.

It is among the objects of the present invention to prepare a paper base textile-like material of sufficient softness, drapeability and hand to compare to woven textiles with the use of paper sheets of very low base weight per area and in which the fibers will give the same softness and drape as a textile material without undue stiffness.

Another object is to provide a basic sheet material having the characteristics of woven textiles and the like which will have relatively high strength and suitable porosity and openness and which will have the wet strength of a textile material as well as the drapeability and other characteristics.

It is among the further objects of the present invention to provide a textile material from paper base fibers which may be readily utilized for disposable sheets, pillow cases, protective clothes, table cloths, and the like.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the objects of this invention, it has been found necessary to utilize creped paper which has a certain degree of extensibility (elongation) and also which has a base weight, or weight per unit area, such than an independent stiffness of the fibers of the paper base material will not impart any undue stiffness and the very weight of the paper will give a flexibility overcoming the stiffness and with the pulp fibers having sufficient movability with respect to one another to give a satisfactory drape, softness and hand.

The extensibility or elongation before break when testing the papers is in the range of 3%–100% and preferably 5%–100%. The creped paper has a weight of 15–30 grams per square meter and the fibers thereof are matted of a length between 1–10 mm. All creped tissue papers can be used as long as they meet these requirements and they are soft and absorbent and have sufficient internal strength. For example, the basic paper material can be a tissue web of creped paper made from sulfate or sulfite pulp with a base weight below 25–30 grams per square meter and desirably between 15–25 or 30 grams per square meter. The paper can be made of pulp, bleached or unbleached, and with the addition of synthetic or natural fibers. Pigments and dyestuffs, as well as rosin and resin, can have been added to the pulp during the manufacture of the creped papers.

The creped tissue paper sheet is impregnated with a non-aqueous organosol or plastisol. The impregnation is sufficient in amount to increase the weight of the base material so that the ratio of paper to impregnant is in the range of from 0.3:1 to 1:1 by weight. The polymer penetrates around and into the paper base fibers while retaining the porous characteristic and fabric-like qualities of the product. The impregnation is carried out in such a way that the pulp fibers will not swell very much if they are kept in water for a while.

It is most important that the plastic material which is applied be of such low viscosity that it will readily penetrate around and into the paper base fibers, and organic solvent solutions which may be used should have a relatively low viscosity and at the same time a high solids content and there should not be an excessive loss of solvent in drying the solution. In achieving the best impregnation, the non-aqueous impregnant medium should have a viscosity not exceeding about 150 poises and desirably the viscosity can vary from 5–30 poises.

The plastisol and/or organosol is based on vinyl resins dispersed in plasticizers and solvents. The resin is not dissolved but is dispersed in the solvent or plasticizer and the plastisol is a resin dispersed in a plasticizer whereas the organosol is a resin dispersed in a solvent. The preferred vinyl resin polymers are those of vinyl acetate, vinyl chloride, vinylidene chloride, or combinations thereof having a molecular weight over 1000, and desirably 10,000 to 100,000, such as those made by Union Carbide and Imperial Chemical Industries Ltd. (CORVIC). Copolymers of polyvinyl chloride and polyvinyl acetates are useful but acrylic resins are not as satisfactory. The vinyl resins that have been used successfully are vinyl chloride resins with a k value (see Fikentscher, Cellulosachemie 13 [1932] page 58) between 50 and 100, preferably 65–80.

It has been found most important that the amount of plasticizer used be such that the ratio of polymer to plasticizer is in the range of from 1.7:1 to 0.5:1 by weight. An amount of plasticizer is preferably used such that the viscosity will be in the range of 500–10,000 centipoises, or most preferably 1000–6000 centipoises. A good ratio is 70–120 parts of the plasticizer to 100 parts of the resin to give a viscosity of 1000–5000 centipoises.

The preferred plasticizers are 3–12 carbon atom alkyl esters of organic carboxylic acids of 6–22 carbon atoms or of phosphoric acids. The preferred alkyl groups have from 4–8 carbon atoms. The organic carboxylic acids are straight saturated or unsaturated mono, di or tricarboxylic acids or aromatic mono, di or tricarboxylic acids, or combinations thereof, of which phthalic, adipic, lauric, oleic, and sebacic acids are typical. The preferred compounds are dibutyl phthalate, dioctyl adipate and dioctyl phthalate.

As organic solvents, there can be used lower aliphatic alcohols such as methyl alcohol, ethyl alcohol and isopropyl alcohol, chlorinated hydrocarbons such as trichloroethylene and carbon tetrachloride, aliphatic hydrocarbons, esters such as ethyl acetate, white spirits, refined low boiling point fractions of petroleum, ketones such as acetone or methyl ethyl ketone, and the like.

To reduce the surface tension, 0.01–0.5% of a silicone oil can be included and there also may be included 0.5–60% of various pigments or fillers such as carbon black, titanium dioxide, soluble dyestuffs or lakes.

The amount of pigment that can be added to the plastisol or organosol can be varied within wide limits; the amount added depends mainly on the viscosity of the prepared plastisol or organosol. Generally, it is disadvantageous to use more than 10 parts of pigment to 100 parts of vinyl resin or plasticizer and it is preferred to use between 1 and 10 parts.

In order to extend the pigment, colloidal silica, $CaCO_3$, $MgCO_3$ or aluminum oxide can be used in the amount of 1–5 parts. In order to compensate for the increase in viscosity, which will often occur when pigments are added, chlorinated hydrocarbon solvents can be used in amounts from 10–25 parts. The solvents evaporate during the heating. As solvents, there can be used petroleum distillates having boiling points of 35°–100° C. and low boiling alcohols such as ethyl alcohol or isopropyl alcohol. It is important, however, that these solvents do not dissolve or swell the dispersed vinyl resin. Even a small swelling of the resin will change the viscosity so much that it can be difficult to apply the paste on the weak web of tissue paper without breaking it.

Further, there can be used organic barium, tin or cadmium compounds ranging up to 1%–4% of the vinyl resin as stabilizing agents. If a non-migrating plasticizer is desired in the plastic web, polymeric plasticizers can be used in combination with the primary plasticizers.

The coating solution is desirably calendared onto the web of paper or the web of paper is run through the coating solution which is desirably agitated so as to maintain any insoluble materials thoroughly dispersed throughout.

After impregnation, the product is heated to swell the vinyl resin in the plasticizer. In general, a temperature of 170°–190° C. is satisfactory.

It has been found that when the plastisol or organosol spreads uniformly through the matted paper fibers, it will greatly increase the strength of such fibers and give them satisfactory drape, softness and hand, whether the pulp fibers be made of ground wood, sulfite pulp, sulfate pulp, or semi-chemical pulp, or pulp which has been mixed with natural fibers of cotton, wood, line, mohair, glass or with synthetic fibers such as nylon, rayon, orlon, dacron, or other fibers of acrylic origin, polyethylene origin, or polyethylene terephthalate.

The resulting impregnated material may be washed, is resistant to heat and ironing, may be cut with a hot tool and sealed with a hot tool, and it is not necessary that it be sewn although it will hold stitching. Two or more layers of paper can be impregnated together or can be impregnated separately and pressed together.

It is desirable in some cases to avoid a wet feel or hand which occurs by impregnation with a vinyl resin which will be swollen by a plasticizer since the plasticizer has a tendency to migrate to the surface and this is particularly disadvantageous with certain types of substitute textile materials. To avoid this, the creped tissue paper after impregnation is laminated by pressure to untreated creped tissue paper or papers having the same or similar weight. A laminated product will be obtained which will have water absorbent properties because of the presence of the untreated creped tissue paper. The lamination will generally be performed before the plastisol and/or organosol is heated to swell the vinyl resin. At the same time, the wet feel of the plastic will disappear on the laminated side of the paper.

If the impregnated paper is laminated on both sides, the wet feel of the plastic coating will not be apparent. The laminate will have high strength due to the impregnated central sheet and will not readily tear or rip when used for towelling or for covering material which should have some water absorptive properties. The weight of the tissue layers on one or both sides of the impregnated layer can vary from 10%–25% of the central resin impregnated layer.

For example, a laminate made of one layer of creped tissue paper having a weight of 15–25 grams per square meter combined with another creped tissue paper having a weight of 10–25 grams per square meter and a pick-up of 30–80 grams per square meter of vinyl plastisol is very suitable for sheetings. As another suitable laminate, a central impregnated creped tissue web is combined with two outside sheets of creped tissue paper to form a substitute for textiles, towels or sheetings. Wet strength resins can be added to the paper sheet to be manufactured to give a still better product with very good wet strength properties.

The laminate fibers will be closely bound to the paper surface and there will be very little tendency for them to abrade to paper dust as ordinary papers generally do.

In order to further illustrate the invention, the following Examples are set forth in which all parts are by weight.

EXAMPLE 1

A single paper web of creped tissue paper 20 to 25 grams per square meter made of bleached kraft is impregnated by passage through a nip between a rubber roller and a steel roller. The rubber roller is of neoprene rubber or silicone rubber. The steel roller dips into a plastisol of the following composition:

| | |
|---|---|
| Polyvinyl resin k-value 60 | 100 parts |
| Dioctyl phthalate | 40 parts |
| Dioctyl adipate | 40 parts |
| Stabilizer Advastab 5216 | 0.5 parts |
| Dispersing agent Advaplast 42 | 10 parts |

| | |
|---|---|
| Titanium dioxide rutile | 10 parts | so that the pick-up of plastisol is between 25 to 75 grams per square meter.

The web is then passed through an oven at a temperature of 170°-180° C. for 1 minute. Afterwards the web is pressed against a cooling cylinder before it is wound up.

The impregnated paper web will have high wet strength and still has the open structure of a tissue paper. It may be used in two layers. From this combined material is made sheets or pillow-cases. The impregnated tissue paper may be sewn or heat sealed and used in the same way as a woven fabric.

EXAMPLE 2

A creped tissue paper made of bleached kraft 17 grams per square meter is impregnated between one or two pairs of pressure rollers in the same way as in Example 1.

The plastisol has the following composition and the amount of plastisol taken up is about 20–40 grams per square meter.

| | | |
|---|---|---|
| Polyvinyl resin | 100 | parts |
| Dioctyl phthalate | 70 | parts |
| Dibutyl phthalate | 10 | parts |
| Stabilizer | 0.5 | parts |
| Dispersing agent | 3 | parts |
| Dyestuff | 2 | parts |

The web is heated by passing over a heated roller 1200 millimeters in diameter. The temperature of the roller is kept at 180° C. and the web is processed at a speed of 20 meters per minute. After passing the heated roller, the web is cooled against a chill roll and wound up.

By using two layers of impregnated tissue papers, curtains are made by heat sealing. The curtains have the same drape as a textile fabric and it is only possible to see the difference from curtains made of woven fabric by very close examination.

EXAMPLE 3

A 30 grams per square meter Clupak paper or extensible paper of bleached kraft is impregnated by organosol in the same way as in Examples 1 and 2. Clupak paper is produced according to Canadian Patent No. 602,930.

The formula for the organosol is:

| | | |
|---|---|---|
| Polyvinyl resin | 100 | parts |
| Dioctyl phthalate | 100 | parts |
| Stabilizing agent | 0.5 | parts |
| Dispersing agent | 3 | parts |
| White Spirits | 10 | parts |
| TiO₂ | 10 | parts |

The web is heated to 180° C. for 30 seconds by the aid of infrared heat lamps. The pick-up of plastisol is between 30 to 100 grams per square meter.

After cooling, the material can be used for the manufacturing of disposable clothes.

EXAMPLE 4

A single paper web of creped tissue paper 20 to 25 grams per square meter of bleached kraft is impregnated by passage through a nip between a rubber roller and a steel roller. The rubber roller is of neoprene rubber or silicone rubber. The steel roller dips into a plastisol of the following composition:

| | |
|---|---|
| Polyvinyl chloride resin k-value 65–80 | 100 parts |
| Plasticizer - equal parts of dioctyl phthalate and dioctyl adipate | 70 parts |
| Stabilizer, dibutyl-tin-dilaurate | 0.5 parts |
| Dispersing agent ethyl polyglycol ether | 1 part | so that the pick-up of plastisol is between 25 to 100 grams per square meter. The web is passed through an oven at a temperature of 170°-180° C. for 1 minute. Afterwards the web is pressed against a cooling cylinder before it is wound up. The impregnated paper web, which by this treatment has high wet strength and still has the open structure of a tissue paper, is used in two layers. From this combined material is made sheets, pillow-cases or curtains. The impregnated tissue papers can be sewn or heat sealed and used in the same way as a woven fabric.

EXAMPLE 5

A creped tissue paper made of bleached kraft 17 grams per square meter is impregnated by the aid of one pair of press rollers in the same way as in Example 1. The plastisol has the following composition and the amount of plastisol taken up is about 20-80 grams per square meter.

| | |
|---|---|
| Polyvinyl chloride resin k-value 70 | 100 parts |
| Dioctyl phthalate | 90 parts |
| Dibutyl phthalate | 5 parts |
| Stabilizer, calcium stearate. | 2 parts |

The web is heated by passing it through or between a heated roller 100 centimeters in diameter. The temperature of the roller is kept at 180° C. and the web moves at a speed of 5 meters per minute. After passing the heater roller, the web is cooled down by a chill roll and wound up. From two layers of impregnated tissue papers curtains are made by heat sealing. The curtains have the same drape as a textile fabric.

EXAMPLE 6

A 30 grams per square meter extensible Clupak paper made by the process of Canadian Pat. No. 602,930 bleached kraft having an elongation of at least 5% is impregnated by a plastisol or organosol in the same way as in Examples 1 and 2. The formula is:

| | |
|---|---|
| Polyvinyl chloride resin k-value 70 | 75 parts |
| Dioctyl phthalate | 75 parts |
| Dibutyl tin-dilaurate | 0.5 parts |
| Polyethylene glycol sorbitan mono-oleate | 3 parts |
| Ethyl alcohol | 10 parts |

The web is heated to 180° C. during 30 seconds by the aid of infrared heater. The pick-up of plastisol is between 30 to 100 grams per square meter. After cooling, the material can be used for the manufacturing of disposable clothes.

EXAMPLE 7

A creped paper of unbleached kraft 25 grams per square meter is sprayed with an excess of plastisol on both sides and the excess is pressed away by a pair of press rollers. The pick-up of plastisol in the paper web is 4 times the basic weight of the paper. The plastisol has the following composition.

| Polyvinyl chloride resin k-value between 65 and 80 | 100 parts |
|---|---|
| Dioctylphthalate plasticizer | 110 parts |
| Mixture of 2 parts barium cadmium laurate + 1 part triphenyl phosphite | 2 parts |
| Aluminum oxide | 3 parts |

After impregnating, the web is heated by passing through an oven with circulating hot air having a temperature of 200°–225° C. Before rewinding, the web is cooled by contacting a chilled cylinder. The impregnated paper can be used for making protecting clothes, useful in case of radioactive fallout.

EXAMPLE 8

A web of paper, made up of two layers of creped tissue papers 20 grams per square meter each, is impregnated by the aid of a set of rollers dipping into a plastisol of the following composition.

| Polyvinyl chloride resin k-value 70 | 100 parts |
|---|---|
| Dioctyl phthalate plasticizer | 90 parts |
| Dibutyl phthalate plasticizer | 5 parts |
| Dyestuff | 5 parts |

The excess of plastisol is taken away by pressing the webs through a nip of two press rollers. The pick-up of plastisol is 100 grams per square meter. The impregnated web is heated to 180° C. by passing a steel cylinder having a diameter of 150 cm. Before being wound up, the web is cooled down by a chilled cylinder. The impregnated web is suitable as a table cloth or packaging material.

EXAMPLE 9

A fireproof textile substitute is made by using a plasticizer which is self-extinguishing. A single web of creped tissue paper having a weight of 15 to 25 grams per square meter is impregnated by a roller coater with a plastisol having the following composition.

| Polyvinyl chloride k-value 70 | 100 parts |
|---|---|
| Tricresyl phosphate | 80–90 parts |
| Calcium stearate | 2 parts |
| Dyestuff for coloring the web | 0.5 parts |

The pick-up of plastisol is 60 to 70 grams per square meter. After impregnating, the web is heated in an oven to 170°–180° C. By infrared heaters for 20–30 seconds. After the oven, the web is chilled down by a chilled steel roller.

This fireproof material is specially suitable as curtains. If two or three layers of creped tissue papers 20 grams per square meter each are impregnated as a laminate, a stronger material will be obtained.

EXAMPLE 10

Two layers of creped tissue papers made of 80% bleached rayon pulp and 20% bleached kraft pulp, having a weight of 25 grams per square meter each, are impregnated with the following:

| Polyvinyl chloride k-value 70 | 100 parts |
|---|---|
| Dioctyl phthalate | 70 parts |
| Methyl alcohol | 10 parts |
| Dibutyl dilaurate | 0.5 parts |
| Soluble dyestuff red | 1 part |

The elongation before break of the papers is 30%. A reverse roll coater is used as the coater for the impregnation, which is followed by one pair of pressure rolls which press the plastisol into the papers. The webs are heated to 180°–190° C. for 1 minute to swell the vinyl resin in the plasticizer and to evaporate the solvent. The web is cooled down to room temperature and wound up.

EXAMPLE 11

A single web of bleached creped tissue paper is impregnated by dipping into the following:

| Polyvinyl chloride resin k-value 70 | 100 parts |
|---|---|
| Polyester resin | 10 parts |
| Dioctyl phthalate | 75 parts |
| Basic lead sulfate | 10 parts |
| Methyl isobutyl ketone | 20 parts |

The excess plastisol taken up is squeezed out by one pair of press rollers. Afterwards, the web is heated by passing hot air having a temperature of 180°–190° C. in order to evaporate the solvent and swell the vinyl resin. After cooling, the web is rewound.

EXAMPLE 12

A web of papers made up of three layers of creped tissue papers, 20 grams per square meter in which the inner layer is impregnated by dipping into a plastisol of the composition:

| Polyvinyl chloride resin k-value 70 | 100 parts |
|---|---|
| Dioctyl phthalate plasticizer | 60 parts |
| Isobutyrate plasticizer | 30 parts |
| Dibasic lead phthalate | 2 parts |
| Alkyl polyglycol ether | 2 parts |
| TiO$_2$ | 10 parts |

The excess of plastisol is metered away by a trailing blade. The pick-up of plastisol is 60 to 120 grams per square meter. The impregnated and laminated web is heated to 180° C. by passing a steel cylinder. Thereafter, the web passes over a cooling cylinder before it is wound up. The impregnated web is suitable for use as towels, scullery-cloth, baby materials, for example.

EXAMPLE 13

A creped tissue paper made of 85% rayon pulp and 15% bleached kraft with a weight of 15 to 25 grams per square meter is impregnated or coated with a mixture of 100 parts vinyl chloride resin, combined with 60–100 parts of a plasticizer, such as dioctyl phthalate. The amount of plastisol picked up is in a range between 1–5 times the weight of the paper.

After impregnation or coating, by dipping or by coating with a roll coater in an ordinary coating machine for paper, the impregnated or coated web is passed through a nip, formed by two rollers under slight pressure. In the nip, one or more untreated webs of creped tissue paper are combined with the treated web.

The two (or three) webs will be laminated by the plastisol as adhesive and the resulting laminated web is heated to 175°–190° C. by passing it over a heated cylinder.

The vinyl resin will swell when heated and bind the two (or three) webs together. After cooling, the laminate can be trimmed, rewound and converted to sheeting.

EXAMPLE 14

A single creped tissue web will be impregnated or coated on both sides with a paper coater by a vinyl organosol and/or a plastisol.

After the treating, the web is passed through a nip formed by two rollers. On each side of the treated web, a web of creped tissue paper will be combined with the coated or impregnated web. The webs of untreated, creped tissue paper can have a weight from 10% to 25% of the weight of the impregnated web. By passing the sheets through a nip, a laminate is formed of one layer of untreated creped tissue web, an impregnated central creped tissue layer and a layer of untreated, creped tissue paper, all layers bound together by the vinyl resin organosol and/or plastisol. The joined webs are heated after the nip as in Example 13 to swell the vinyl resin.

If wet strength resins are added to the papers during manufacture, a laminate with very good wet strength will be obtained. The papers can be dyed in any color and be made with the addition of synthetic as well as organic fibers.

EXAMPLE 15

A double layer of creped tissue papers, or two sheets on top of each other are impregnated or coated from one side by passing over a paper coater where there is applied a vinyl plastisol and/or organosol. The viscosity of the plastisol and/or organosol is such that it penetrates the first layer of tissue paper.

This first layer will be impregnated and bind to itself the second layer of creped tissue paper.

After lamination the web is heated by passing through an oven to swell the vinyl resin in the plasticizer.

EXAMPLE 16

A double layer of creped tissue papers as described in Example 15, is passed through a nip formed by two rollers under pressure. In the nip, the coated or impregnated side of the web is laminated to an untreated web of creped tissue paper. A laminate will be formed having an outside untreated layer of creped tissue paper with a central impregnated layer of creped tissue paper and a second outside untreated layer of creped tissue paper.

Various changes and modifications can be made by those skilled in the art without departing from the spirit and scope of the invention. The various embodiments set forth herein were for the purpose of further illustrating the invention but were not intended to limit it.

I claim:

1. A treated paper product having the softness, drape, appearance and hand of soft, limp, woven textile fabrics and useful as a substitute fabric, said product comprising: a sheet being composed of an extensible creped tissue paper having a base weight in the range of from 15–30 grams per square meter; said creped tissue paper having an elongation in the range of 3%–100% to permit substantially independent movement of the fiber to enhance the textile effect; said sheet being impregnated with a non-aqueous organo-sol or plastisol having a viscosity of 500–10,000 centipoises and comprising:

a vinyl polymer containing a plasticizer, the ratio of polymer to plasticizer being in the range of from 1.7:1 to 0.5:1 by weight, wherein said vinyl polymer has a molecular weight over 1,000 and up to 100,000 and a $k$-value of 50–100 and wherein said plasticizer is a 3–12 carbon atom alkyl ester of organic carboxylic acids of 6–12 carbon atoms or of phosphoric acids:

the impregnation being sufficient in amount to increase the weight of the base material so that the ratio of paper to impregnant is in the range of from 0.3:1 to 1:1 by weight;

wherein said polymer penetrates around and into the paper base fibers while retaining the porous characteristic and fabric-like qualities of the product.

2. The product of claim 1 wherein the viscosity of the organosol or plastisol is in the range of from 500 to 6000 centipoises.

3. The product of claim 1 wherein the vinyl polymer is a polyvinyl chloride.

4. The product of claim 1 wherein the vinyl polymer is a vinyl chloride-vinyl acetate copolymer.

5. The product of claim 1 wherein the paper is formed from synthetic fibers in addition to cellulose fibers.

6. The product of claim 1 wherein the plasticizer is dioctyl phthalate, dibutyl phthalate, or dioctyl adipate.

7. The product of claim 1 wherein a soluble dye is incorporated in the plastisol or organosol.

8. The product of claim 1 wherein at least two impregnated webs are laminated together under pressure whereby a substitute for textile material consisting of a composite web is obtained.

9. The product of claim 1 wherein the impregnated web is laminated with a similar unimpregnated paper web to obtain a substitute for textile material consisting of a composite web.

* * * * *